United States Patent
Flick

(10) Patent No.: US 11,833,933 B2
(45) Date of Patent: Dec. 5, 2023

(54) LONGITUDINAL ADJUSTING DEVICE FOR THE MOTORIZED LONGITUDINAL ADJUSTMENT OF A VEHICLE SEAT, AND VEHICLE SEAT

(71) Applicant: ADIENT ENGINEERING AND IP GMBH, Burscheid (DE)

(72) Inventor: Joachim Flick, Huckeswagen (DE)

(73) Assignee: Adient US LLC, Plymouth, MI (US)

( * ) Notice: Subject to any disclaimer, the term of this patent is extended or adjusted under 35 U.S.C. 154(b) by 64 days.

(21) Appl. No.: 17/432,160

(22) PCT Filed: Mar. 3, 2020

(86) PCT No.: PCT/EP2020/055499
§ 371 (c)(1),
(2) Date: Aug. 19, 2021

(87) PCT Pub. No.: WO2020/178264
PCT Pub. Date: Sep. 10, 2020

(65) Prior Publication Data
US 2022/0185150 A1    Jun. 16, 2022

(30) Foreign Application Priority Data

Mar. 4, 2019 (DE) ..................... 10 2019 105 454.0

(51) Int. Cl.
*B60N 2/07* (2006.01)
*B60N 2/06* (2006.01)

(52) U.S. Cl.
CPC ........... *B60N 2/0727* (2013.01); *B60N 2/067* (2013.01); *B60N 2/0715* (2013.01)

(58) Field of Classification Search
CPC .... B60N 2/0727; B60N 2/067; B60N 2/0715; B60N 2/0705; B60N 2205/20
(Continued)

(56) References Cited

U.S. PATENT DOCUMENTS 8,061,756 B2 * 11/2011 Kimata ................ B60N 2/0715
296/65.13
8,523,263 B2 * 9/2013 Kimura .................. B60N 2/067
296/65.13
(Continued)

FOREIGN PATENT DOCUMENTS

DE           10139631 A1     3/2003
DE       102006011717 A1    10/2006
(Continued)

OTHER PUBLICATIONS

PCT International Search Report and Written Opinion (PCT/EP2020/055499).
(Continued)

*Primary Examiner* — Nkeisha Smith
(74) *Attorney, Agent, or Firm* — Marshall & Melhorn, LLC

(57) ABSTRACT

A longitudinal adjusting device for the motorized longitudinal adjustment of a motor vehicle seat may have a first rail and a second rail. The device may also have a spindle gearbox, a spindle cooperating with the spindle gearbox for the longitudinal adjustment, and a mount for receiving the spindle gearbox. The spindle gearbox may be at least partly held in the inner channel so as to be fixed relative to the first rail. Laterally projecting protrusions of the holding legs of the mount, which legs may be each arranged in front of and behind the spindle gearbox in the longitudinal direction, engage through lateral openings in the first rail. An abutment device having a contact section may be arranged in the region of the lateral openings. The contact section contacts the holding leg arranged in the particular opening. A vehicle seat with the device is also provided.

14 Claims, 4 Drawing Sheets

(58) Field of Classification Search
USPC .................................................. 248/429, 430
See application file for complete search history.

(56) References Cited

U.S. PATENT DOCUMENTS

| | | | | |
|---|---|---|---|---|
| 8,814,123 B2* | 8/2014 | Suzuki | ..................... | B60N 2/06 |
| | | | | 296/65.01 |
| 9,511,685 B2* | 12/2016 | Enokijima | ............. | B60N 2/067 |
| 9,597,980 B2* | 3/2017 | Morishita | ............... | B60N 2/075 |
| 9,815,389 B2* | 11/2017 | Elsarelli | ................ | B60N 2/0722 |
| 10,137,803 B2* | 11/2018 | Hoffmann | ............ | B60N 2/0715 |
| 10,486,554 B2* | 11/2019 | Napau | ...................... | B60N 2/06 |
| 10,857,912 B2* | 12/2020 | Rey | ......................... | B60N 2/067 |
| 11,273,506 B2* | 3/2022 | Napau | ..................... | B23F 11/00 |
| 2018/0065507 A1 | 3/2018 | Napau et al. | | |
| 2020/0282870 A1* | 9/2020 | Hsi | ....................... | B60N 2/0727 |
| 2022/0234477 A1* | 7/2022 | Imamura | ................ | B60N 2/067 |
| 2022/0305962 A1* | 9/2022 | Imamura | ............. | F16H 57/0025 |

FOREIGN PATENT DOCUMENTS

| | | |
|---|---|---|
| DE | 102006022947 B3 | 9/2007 |
| DE | 102016225835 A1 | 3/2018 |
| EP | 3290261 A1 | 3/2018 |
| EP | 3613629 A1 | 2/2020 |
| WO | 2013017633 A1 | 2/2013 |
| WO | 2017202870 A1 | 11/2017 |

OTHER PUBLICATIONS

China National Intellectual Property Administration, Office Action in Application No. CN202080018592.3, dated Jan. 4, 2023, 12 pages.

* cited by examiner

LONGITUDINAL ADJUSTING DEVICE FOR THE MOTORIZED LONGITUDINAL ADJUSTMENT OF A VEHICLE SEAT, AND VEHICLE SEAT

The invention relates to a longitudinal adjusting device for the motorized longitudinal adjustment of a vehicle seat, in particular a motor vehicle seat, having a first rail, a second rail which is displaceable relative to the first rail, wherein an inner channel is formed between the first rail and the second rail, a spindle mechanism and a spindle interacting with the spindle mechanism for the longitudinal adjustment, wherein the spindle mechanism is held by a holder for receiving the spindle mechanism in a manner at least partially fixed in the inner channel relative to the first rail, and the spindle is fixed relative to the second rail, wherein laterally protruding protrusions of the holding limbs of the holder, said holding limbs each being arranged in the longitudinal direction of the first rail upstream and downstream of the spindle mechanism, reach through lateral openings of the first rail. The invention furthermore relates to a vehicle seat.

FIELD

DE 101 39 631 A1 discloses a longitudinal adjusting device of the type in question for a vehicle seat for the motorized longitudinal adjustment of the vehicle seat, having a first seat rail, a second seat rail which is displaceable relative to the first seat rail, a first gearing element of the first seat rail and a second gearing element which interacts with the first gearing element for the longitudinal adjustment and is mounted in a rail-mounted housing of the second seat rail, wherein the second seat rail forms part of the housing, and a further part of the housing is formed by bearing plates arranged in each case in the longitudinal direction of the seat rails upstream and downstream of the second gearing element, wherein the lateral edges of the bearing plates reach through lateral openings of the second seat rail and are connected to the latter in an integrally bonded manner.

BACKGROUND

The invention is based on the problem of improving a longitudinal adjusting device of the type mentioned at the beginning, in particular of ensuring simple installation and of avoiding the production of annoying noises during use of the longitudinal adjusting device, and of providing a corresponding vehicle seat.

SUMMARY

This problem is solved according to the invention by a longitudinal adjusting device for the motorized longitudinal adjustment of a vehicle seat, in particular a motor vehicle seat, having a first rail, a second rail which is displaceable relative to the first rail, wherein an inner channel is formed between the first rail and the second rail, a spindle mechanism and a spindle interacting with the spindle mechanism for the longitudinal adjustment, wherein the spindle mechanism is held by a holder for receiving the spindle mechanism in a manner at least partially fixed in the inner channel relative to the first rail, and the spindle is fixed relative to the second rail, wherein laterally protruding protrusions of the holding limbs of the holder, said holding limbs each being arranged in the longitudinal direction of the first rail upstream and downstream of the spindle mechanism, reach through lateral openings of the first rail, wherein a respective abutment means with a contact portion is arranged in the region of the lateral openings, wherein the contact portion makes contact with the holding limb arranged in the respective opening.

Owing to the fact that a respective abutment means with a contact portion is arranged in the region of the lateral openings, wherein the contact portion makes contact with the holding limb arranged in the respective opening, the contact surface, which is loaded in the longitudinal direction, between the first rail and the holding limbs can be reduced and can be cushioned by elastic deformability of the abutment means in the event of small transverse movements of the holding limbs relative to the first rail. Owing to the fact that the abutment means are deformed during the small transverse movements, no friction arises between the abutment means and the holding limbs that could cause undesirable noises.

The abutment means can be formed integrally with the first rail. The abutment means can be cut free or punched free from the material of the rail. The abutment means can be configured in the form of a tab. The abutment means can be deployed from the first rail. A flexibility of the abutment means in a transverse direction can be higher than a flexibility of the abutment means in the longitudinal direction. A rigidity of the abutment means in the longitudinal direction can be higher than a rigidity of the abutment means in the transverse direction.

The holder can be designed as a U-shaped holding clip with two parallel holding limbs. A respective free end of the holding limbs can be directed downward.

The protrusions can be step-shaped. A shape of the respective protrusions can correspond to lateral openings in mutually opposite sidewalls of the first seat rail.

A gap can be provided on both sides of the holding limbs except for the contact of the holding limb with the contact portion of the abutment means in the longitudinal direction. A gap encircling the protrusions can be provided on both sides of the holding limbs except for the contact of the holding limb with the contact portion of the abutment means in the longitudinal direction.

The contact portions of the two abutment means of each sidewall of the first rail can be oriented toward each other.

This problem is furthermore solved according to the invention by a vehicle seat, in particular a motor vehicle seat, having a seat part and a longitudinal adjusting device connected to the seat part for the motorized longitudinal adjustment of the vehicle seat according to the description above.

Expressed in other words, an interface with a holder is formed in a first rail of a longitudinal adjusting device in such a manner that a direct support in the longitudinal direction of the first rail takes place by a cut-free tab. The latter, by elastic deformation and by bending, can absorb the small transverse movements occurring in the upper rail profile. Noises arising in the case of devices known from the prior art, in particular annoying noises arising due to friction under contact, are advantageously avoided here. By means of a direct abutment in the longitudinal direction of the holder with respect to the first rail, furthermore tolerances that occur for the construction space of a spindle mechanism can be reduced.

A relatively large gap in the lower region of the holder ensures that there is no contact there during normal use in the longitudinal direction. Only in the event of an excessive load, for example an accident, does contact occur between the lower end of the holder and the first rail after deformation of the tabs, in order to be able to transmit the high loads which occur.

The holder is fastened, preferably welded, in particular to the surface of the first rail.

BRIEF DESCRIPTION OF THE FIGURES

The invention is explained in more detail below with reference to an advantageous exemplary embodiment which is illustrated in the figures. However, the invention is not restricted to this exemplary embodiment. In the figures.

DETAILED DESCRIPTION

Figure 1:
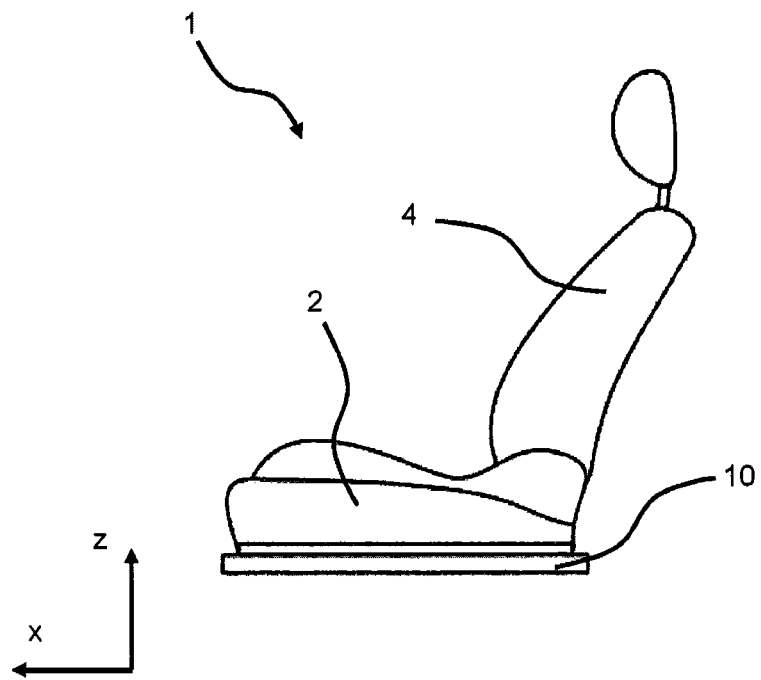
FIG. 1: shows a schematic side view of a vehicle seat according to the invention.

A vehicle seat 1 according to the invention which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 1 installed in the vehicle, the vertical direction z runs parallel to the vehicle vertical axis.

The position specifications and direction specifications used, such as, for example, front, rear, top and bottom, relate to a viewing direction of an occupant seated in the vehicle seat 1 in a normal seat position, wherein the vehicle seat 1 is installed in the vehicle and is oriented in a use position suitable for passenger transport and in the driving direction as customary. However, the vehicle seat 1 according to the invention may also be installed in a different orientation, for example transversely with respect to the driving direction.

The vehicle seat 1 for a motor vehicle has a seat part 2 and a backrest 4 which is adjustable in its inclination relative to the seat part 2. An inclination of the backrest 4 can be adjustable, for example, by a latching fitting or a geared fitting. The vehicle seat 1 is mounted on a longitudinal adjusting device 10 for the adjustment of a seat longitudinal position.

Figure 2:
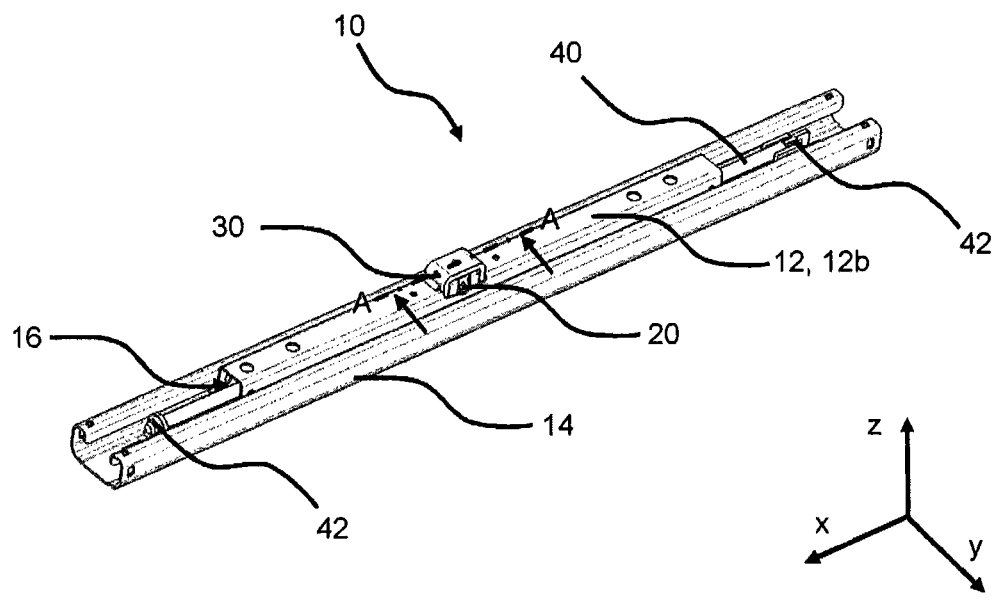
FIG. 2: shows a perspective view of a longitudinal adjusting device according to the invention.

FIG. 2 shows the longitudinal adjusting device 10 according to the invention of the vehicle seat 1. The longitudinal adjusting device 10 has at least one pair of rails, preferably two pairs of rails. The pairs of rails are each formed from a first rail 12, in particular for connection to a seat structure, and a second rail 14, in particular for connection to a vehicle structure. The rails 12, 14 of the pair of rails are displaceable relative to each other in the longitudinal direction x and engage mutually around each other forming an inner channel 16.

Figure 3:
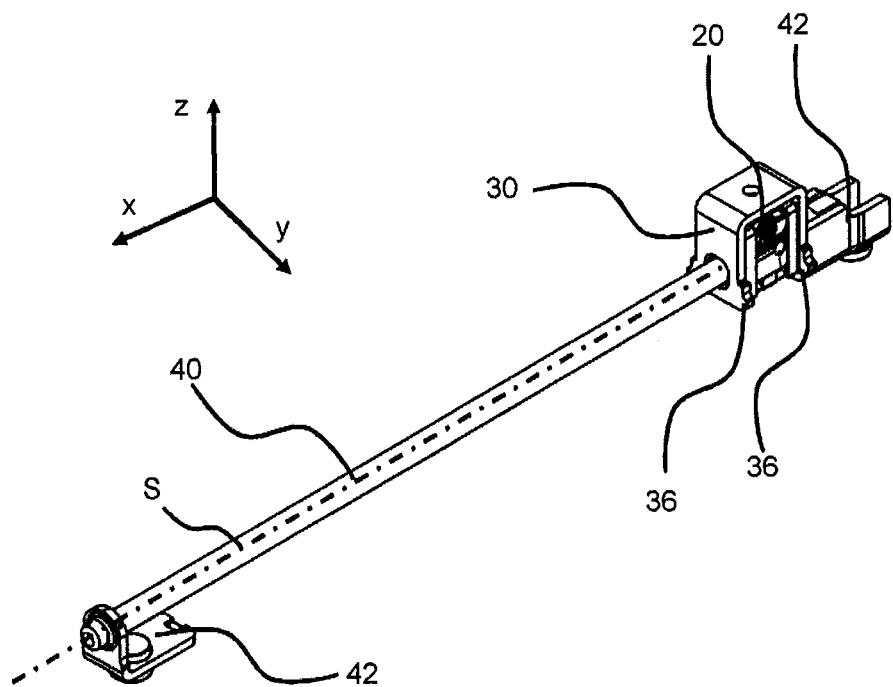
FIG. 3: shows a perspective view of components arranged within an inner channel of the longitudinal adjusting device according to FIG. 2, FIG. 4: shows part of a longitudinal section of the longitudinal adjusting device along the line A-A in FIG. 2, FIG. 5: shows a perspective view of the longitudinal adjusting device according to FIG. 2 obliquely from below in the region of the spindle mechanism, with a second rail not being illustrated.

FIG. 3 shows a perspective view of components arranged inside the inner channel 16 of the longitudinal adjusting device 10. A spindle mechanism 20, which is mounted on the first rail 12, and a spindle 40, which is operatively connected to the spindle mechanism 20, is arranged in the inner channel 16. The spindle 40 extends along a spindle axis S parallel to the longitudinal direction x. The spindle 40 is held at its respective ends by two spindle holders 42 for conjoint rotation and is fixed relative to the second rail 14.

A spindle mechanism 20 which is drivable by a motor, not illustrated, and interacts with the spindle 40 is arranged on a central portion of the first rail 12. The motor can be held on a motor carrier, which is mounted between two spindle mechanisms 20 of two parallel pairs of rails of the longitudinal adjusting device 10 and, using a shaft, likewise not illustrated, can drive the two mechanisms 20. With regard to the functioning of the mechanism, reference is made to DE 10 2016 225 835 A1, the disclosure of which in this regard is expressly incorporated.

Figure 4:
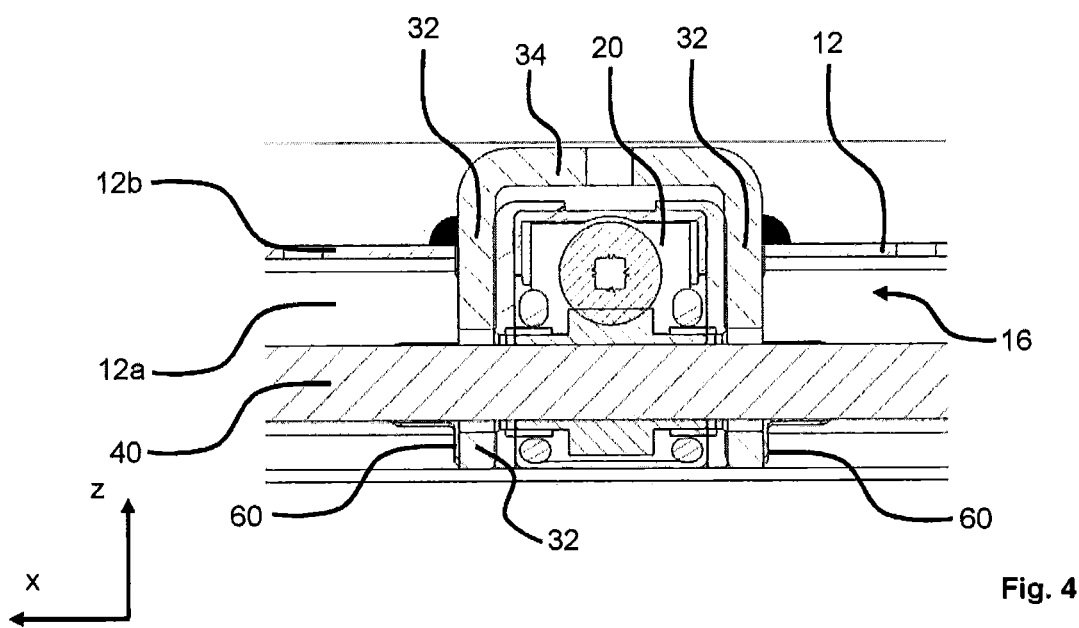

FIG. 4 shows a longitudinal section of the longitudinal adjusting device 10 along the line A-A in FIG. 2, in particular in the region of the spindle mechanism 20. A housing of the spindle mechanism 20 has in particular dimensions adapted to a holder 30 and/or an adapted form.

Figure 5:
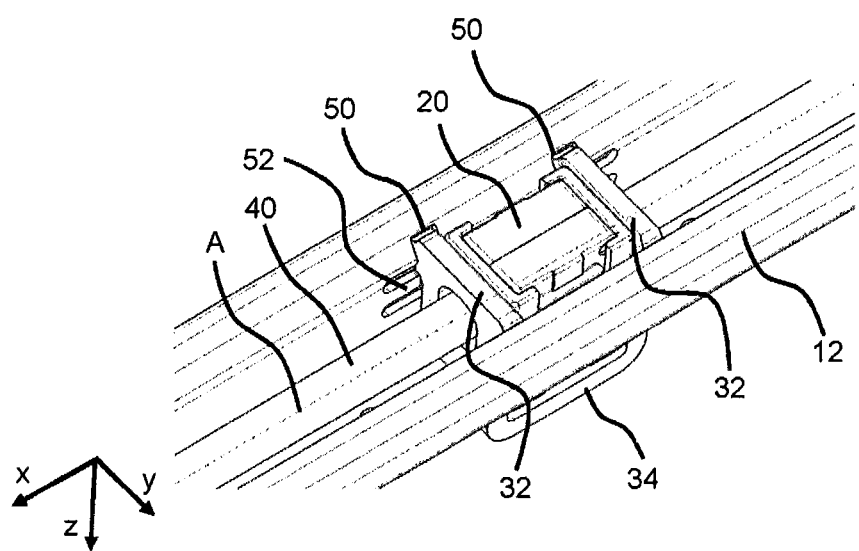

FIG. 5 shows a perspective view of the longitudinal adjusting device 10 according to FIG. 2 obliquely from below, with the second rail 14 not being illustrated.

Figure 6:
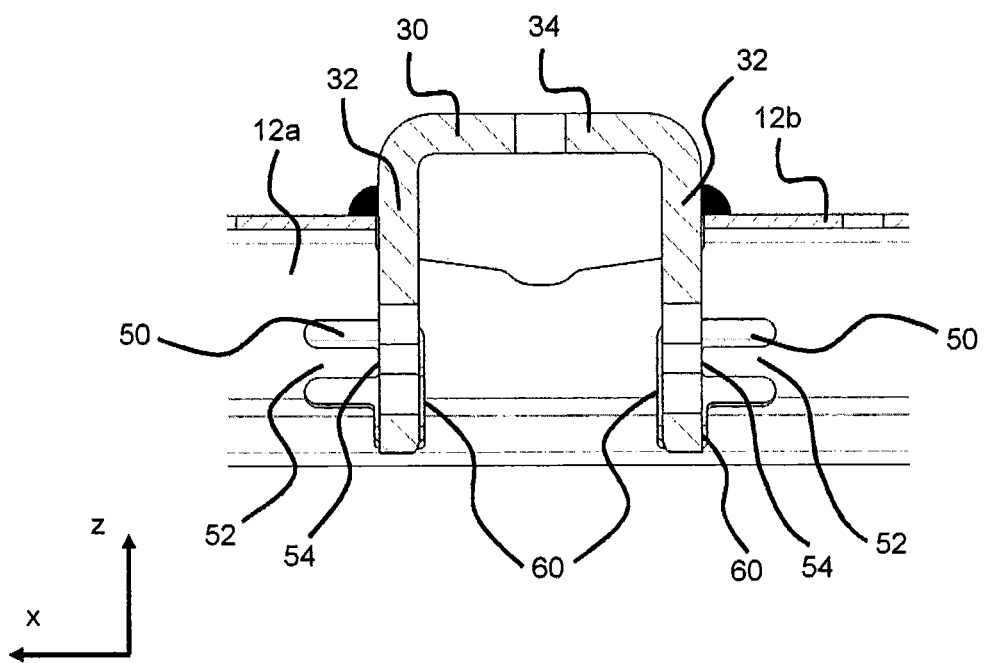
FIG. 6: shows part of a longitudinal section of the first rail and of a holder along the line A-A in FIG. 2, and FIG. 7: shows a perspective view of the holder in a first rail illustrated in sectioned form.

FIG. 6 shows a view of a longitudinal section of the first rail 12 and of the holder 30. The holder 30 is designed as a profiled element, in particular as a U-shaped holding clip. The holder 30 comprises two holding limbs 32 which are connected to each other by a connecting portion 34. The holder 30 is formed integrally and is, for example, a shaped part. At the lower corner regions of the holding limbs 32, protrusions 36 protrude outward parallel to the transverse direction y.

In the exemplary embodiment illustrated, each holding limb 32 comprises a protrusion 36 at each of its opposite lower corner regions in the transverse direction y. The respective protrusions 36 correspond in shape to lateral openings 50 in mutually opposite sidewalls 12a of the first seat rail 12. The protrusions 36 here are configured to engage in the openings 50 in a form-fitting and/or force-fitting manner. The protrusions 36 can preferably latch into the openings 50. The holder 30 protrudes with the holding limbs 32 through a recess in an upper portion 12b connecting the two sidewalls 12a of the first rail 12, and therefore the connecting portion 34 of the holder 30 is arranged outside, in particular above, the inner channel 16. The holder 30 is connected in an integrally bonded manner, in particular welded or adhesively bonded, to the upper portion 12b in the region of the recess.

The lateral openings 50 are cut in a circumferential portion, which is oriented forward or rearward in the longitudinal direction x, in such a manner that a respective abutment means 52, in particular in the form of a tab which has been cut free, is produced. The openings 50 in the present case have an F-shaped or correspondingly a vertically flipped F-shaped profile. The abutment means 52 makes contact, with a contact portion 54, with the holding limb 32 arranged in the respective opening 50.

The abutment means 52 is configured in such a manner that it projects with its contact portion 54 into a region of the opening 50, in particular projects into the opening 50 or projects over the opening 50, and keeps the respective contacted holding limb 32 at a distance from an edge portion of the opening 50 forming a gap 60. A gap 60, in particular a gap 60 encircling the protrusions 36, is provided in the longitudinal direction x on both sides of the holding limb 32 except for the contact of the holding limb 32 with the contact portion 54 of the abutment means 52. The contact portions 54 of the two abutment means 52 of each sidewall 12a of the first rail 12 are preferably oriented toward each other. In this way, the holding limbs 32 can be slightly pretensioned in the direction of the abutment means 52 and are supported on both sides on the contact portions 54.

Figure 7:
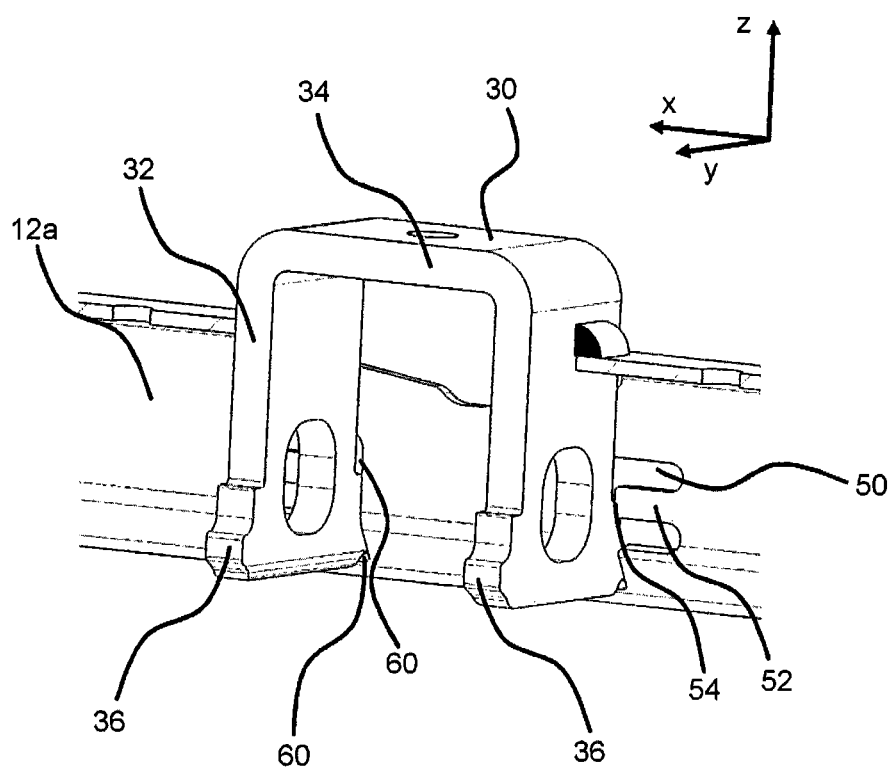

FIG. 7 shows a perspective view of the holder 30 in a first rail 12, illustrated in sectioned form. The protrusions 36 are each arranged in a lower region of the holding limbs 32. Furthermore, the protrusions 36 are each step-shaped and protrude parallel to the transverse direction y.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the selection of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims.

Terms such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

1 Vehicle seat
2 Seat part
4 Backrest
10 Longitudinal adjusting device
12 First rail
12a Sidewall
12b Upper portion
14 Second rail
16 Inner channel
20 Spindle mechanism
30 Holder
32 Holding limb
34 Connecting portion
36 Protrusion
40 Spindle
42 Spindle holder
50 Opening
52 Abutment means
54 Contact portion
60 Gap
S Spindle axis
x Longitudinal direction
y Transverse direction
z Vertical direction

What is claimed:

1. A longitudinal adjusting device for the motorized longitudinal adjustment of a motor vehicle seat, having a first rail, a second rail which is displaceable relative to the first rail, wherein an inner channel is formed between the first rail and the second rail, a spindle mechanism and a spindle interacting with the spindle mechanism for the longitudinal adjustment, wherein the spindle mechanism is held by a holder for receiving the spindle mechanism in a manner at least partially fixed in the inner channel relative to the first rail, and the spindle is fixed relative to the second rail, wherein the holder comprises holding limbs each being arranged in the longitudinal direction upstream and downstream of the spindle mechanism, characterized in that laterally protruding protrusions of the holding limbs reach through lateral openings of the first rail, wherein an abutment device with a contact portion is arranged in a region of the lateral openings, wherein each contact portion makes contact with one of the holding limbs arranged in the lateral openings and keeps the contacted holding limb at a distance from an edge portion of the lateral opening forming a gap, wherein the abutment device is configured in the form of a tab.

2. The longitudinal adjusting device as claimed in claim 1, wherein the abutment device is formed integrally with the first rail.

3. The longitudinal adjusting device as claimed in claim 1, wherein the abutment device is cut free or punched free from the material of the first rail.

4. The longitudinal adjusting device as claimed in claim 1, wherein the abutment device is deployed from the first rail.

5. The longitudinal adjusting device as claimed in claim 1, wherein a flexibility of the abutment device in a transverse direction is higher than a flexibility of the abutment device in the longitudinal direction.

6. The longitudinal adjusting device as claimed in claim 1, wherein a rigidity of the abutment device in the longitudinal direction is higher than a rigidity of the abutment device in the transverse direction.

7. The longitudinal adjusting device as claimed in claim 1, wherein the holder is designed as a U-shaped holding clip with two parallel holding limbs.

8. The longitudinal adjusting device as claimed in claim 1, wherein each free end of the holding limbs is directed downward.

9. The longitudinal adjusting device as claimed in claim 1, wherein the laterally protruding protrusions are step-shaped.

10. The longitudinal adjusting device as claimed in claim 1, wherein a shape of each of the laterally protruding protrusions corresponds to the lateral openings in mutually opposite sidewalls of the first seat rail.

11. The longitudinal adjusting device as claimed in claim 1, wherein the gap is provided on both sides of each holding limb except for the contact of each holding limb with the contact portion of the abutment device in the longitudinal direction.

12. The longitudinal adjusting device as claimed in claim 1, wherein the gap encircling the laterally protruding protrusions is provided on both sides of each holding limb except for the contact of each holding limb with the contact portion of the abutment device in the longitudinal direction.

13. The longitudinal adjusting device as claimed in claim 1, wherein the contact portions of two abutment devices of each sidewall of the first rail are oriented toward each other.

14. A motor vehicle seat, having a seat part and a longitudinal adjusting device connected to the seat part for the motorized longitudinal adjustment of the vehicle seat as claimed in claim 1.

* * * * *